(12) United States Patent
Han et al.

(10) Patent No.: US 9,294,920 B2
(45) Date of Patent: Mar. 22, 2016

(54) CAPTIVE PORTAL SYSTEMS, METHODS, AND DEVICES

(71) Applicant: Avaya Inc., Basking Ridge, NJ (US)

(72) Inventors: Seung Bong Han, Tracy, CA (US); Yong Seok Joo, San Jose, CA (US); Binoj Pattathiparambil Gangadharan, Kerala (IN)

(73) Assignee: Avaya Inc., Santa Clara, CA (US)

( * ) Notice: Subject to any disclaimer, the term of this patent is extended or adjusted under 35 U.S.C. 154(b) by 258 days.

(21) Appl. No.: 14/033,450

(22) Filed: Sep. 21, 2013

(65) Prior Publication Data

US 2015/0089592 A1   Mar. 26, 2015

(51) Int. Cl.
*H04L 29/06* (2006.01)
*H04W 12/06* (2009.01)
*H04W 88/00* (2009.01)
*H04W 4/00* (2009.01)

(52) U.S. Cl.
CPC ............ *H04W 12/06* (2013.01); *H04L 63/08* (2013.01); *H04W 4/008* (2013.01); *H04W 88/005* (2013.01)

(58) Field of Classification Search
USPC .......................................................... 726/4
See application file for complete search history.

(56) References Cited

U.S. PATENT DOCUMENTS

| 2004/0214576 | A1 | 10/2004 | Myers et al. | |
|---|---|---|---|---|
| 2005/0204168 | A1* | 9/2005 | Johnston | H04L 63/08 726/5 |
| 2012/0281540 | A1* | 11/2012 | Khan et al. | 370/241 |
| 2013/0347073 | A1 | 12/2013 | Bryksa et al. | |

FOREIGN PATENT DOCUMENTS

| EP | 1705869 A1 | 9/2006 |
|---|---|---|
| EP | 2415226 A1 | 5/2012 |
| GB | 2494891 A | 3/2013 |
| WO | 2010115455 A1 | 10/2010 |
| WO | 2013121101 A1 | 8/2013 |

OTHER PUBLICATIONS

Search Report Under Section 17(5) dated Feb. 6, 2015 in Corresponding Application No. GB 1311085.3.

* cited by examiner

*Primary Examiner* — Jason Lee

(57) ABSTRACT

Embodiments of the present technology provide out-of-band captive portal devices, networks, and methods. An example of a method includes executing a redirection of a client request for network access to a captive portal login, initiating an association between the wireless controller and the client, receiving authentication credentials of client from the captive portal login, negotiating a change of authorization with a wireless controller in accordance with RFC 5176 protocol, wherein the controller includes a mapping to a captive portal Internet Protocol (IP) address, and redirecting the client to a URL specified in the client request for network access.

16 Claims, 14 Drawing Sheets

CAPTIVE PORTAL SYSTEMS, METHODS, AND DEVICES

BACKGROUND

When a client tries to access a WiFi hot spot, for example, at a coffee shop or airport, the client typically receives a pop up login screen that requires the client to enter authentication credentials. If a user is not logged into the wireless network or even attempting to login to the wireless network, client devices within range of the access point of the wireless network may transmit repeated authentication requests, generating network congestion. As a result, clients that are actively coupled with the wireless terminal may experience latency while connected to the wireless network, especially in public places where client devices may be numerous (e.g., a stadium, shopping mall, concert, etc.).

SUMMARY

According to some embodiments, the present technology may be directed to methods that comprise: (a) executing a redirection of a client request for network access to a captive portal login; (b) initiating an association between the wireless controller and the client; (c) receiving authentication credentials of client from the captive portal login; (d) negotiating a change of authorization with a wireless controller in accordance with RFC 5176 protocol to authorize the client, wherein the controller includes a mapping to a captive portal Internet Protocol (IP) address; and (e) redirecting the client to a URL specified in the client request for network access.

According to other embodiments, the present technology may be directed a captive portal device that comprises: (a) a processor; and (b) a memory for storing logic that when executed by the processor causes the captive portal device to (i) execute a redirection of a client request for network access to a captive portal login; (ii) initiate an association between the wireless controller and the client; (iii) receive authentication credentials of client from the captive portal login; (iv) negotiate a change of authorization with a wireless controller in accordance with RFC 5176 protocol to authorize the client, wherein the controller includes a mapping to a captive portal Internet Protocol (IP) address; and (v) redirect the client to a URL specified in the client request for network access.

According to other embodiments, the present technology may be directed a wireless controller that comprises: (a) a processor; and (b) a memory for storing logic that when executed by the processor causes the wireless controller to (i) receive a client request for network access from an access point associated with the client; (ii) establish an association between the access point and the client, the association not allowing access to the network by the client; and (iii) negotiate a change of authorization with a captive portal device according to an RFC 5176 protocol to authorize the client, wherein the captive portal device is mapped to the wireless controller using a captive portal Internet Protocol (IP) address.

DETAILED DESCRIPTION

Figure 1:
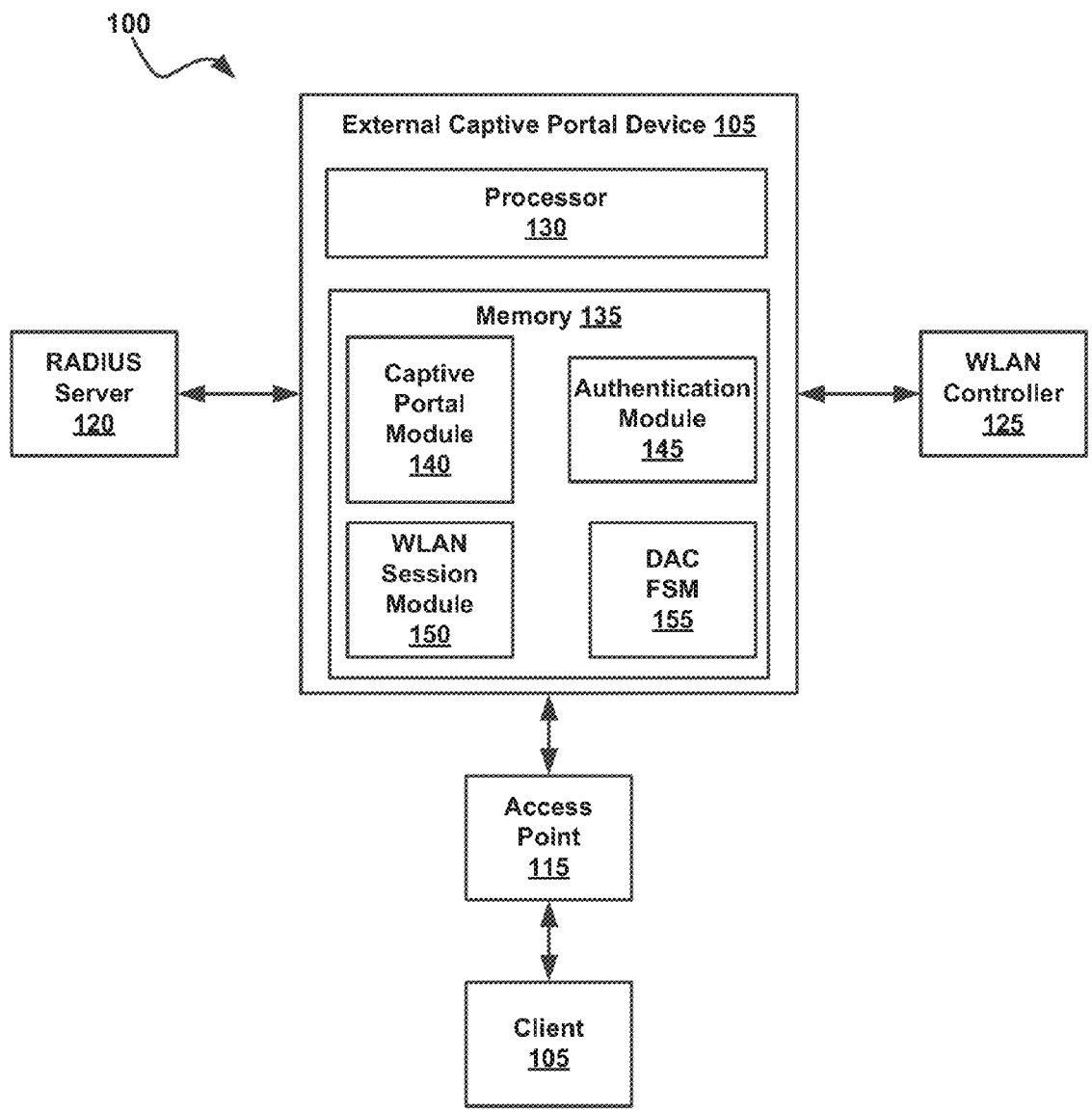
FIG. 1 is a schematic diagram of a wireless network that includes an external captive portal network that is constructed in accordance with the present disclosure.

Referring to the FIG. 1, embodiments generally relate to a wireless network 100 that includes an out-of-band external captive portal device 105. In some embodiments, the wireless network 100 also generally comprises a client 110, an access point 115, a RADIUS server 120 (also referred to as a remote access server), and a WLAN controller 125. Other examples of wireless networks that can be used to practice aspects of the present technology are illustrated in FIGS. 11A-13B, which will be described in greater detail below.

The client 110 includes any device that is configured to couple with the access point 115. Non-limiting examples of clients include a cell phone, a smart phone, a laptop, a tablet, a machine-to-machine device, such as a smart sensor, or other similar devices that would be known to one of ordinary skill in the art.

The access point 115 includes any device that permits clients to connect to a wired or wireless network using a wireless communications protocol. A non-limiting example of an access point 115 includes a wireless router or modem. The access point 115 may allow for a plurality of clients to access a public network, such as the Internet, although other examples of networks may include a private network device or an intranet.

The access point 115 is coupled with the external captive portal device 105 and the WLAN controller 125. The external captive portal device 105 is coupled with the RADIUS server 120. In general, the RADIUS server 120 includes any computing device that is configured to implement a Remote Authentication Dial-In User Service (RADIUS) protocol for authenticating clients for network access. In some embodiments, the functionalities of the external captive portal device 105 and the RADIUS server 120 may be co-located or combined on the same device, such as server. In some embodiments, the external captive portal device 105 and RADIUS server 120 may include virtual machines that execute on a server or within a cloud computing environment.

In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple clients (e.g., cloud resource customers or other users). Typically, each client places workload demands upon the cloud that vary in real-time, sometimes dramatically. The nature and extent of these variations typically depend on the type of business associated with the entity.

In some embodiments, the external captive portal device 105 comprises a processor 130 and a memory 135 for storing logic. According to some embodiments, the logic comprises a captive portal module 140, an authentication module 145, a WLAN session module 150, and a dynamic access client (DAC) finite state machine (FSM) 155. The processor 130 is configured to execute the various modules of the external captive portal device 105 to provide the external captive portal functionalities described herein.

In various embodiments, the logic may include additional modules, engines, or components. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the logic may include separately configured servers or computing devices. The various modules of the external captive portal device 105 will be described in greater detail with regard to the signal flow diagram of FIG. 3.

In an example embodiment, the wireless network 100 is configured to utilize an HTTP redirect method in combination with an authentication method that employs a RFC5176 protocol change of authorization (CoA) messages. Prior to execution of the HTTP redirect method or the authentication method, a method of determining if the client 110 is authorized to utilize the access point 115 is performed.

Figure 2:
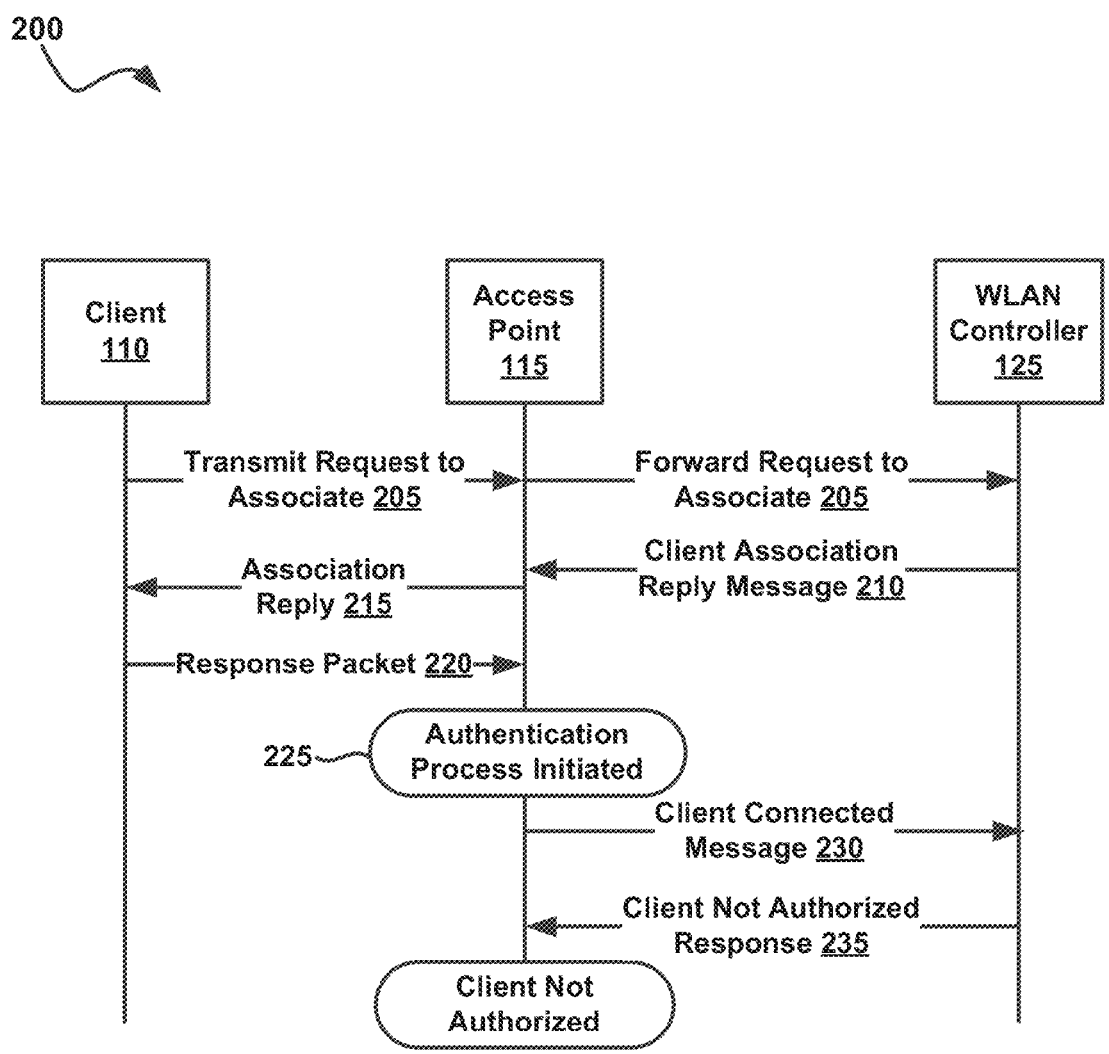
FIG. 2 is a signal flow diagram of a client association method for coupling the client with an access point.

FIG. 2 is a signal flow diagram of an example of an initial client authentication verification method 200 that is executed within the wireless network 100 of FIG. 1. In general, this method allows for association between the client 110 and the access point 115, although the association does not allow the client to access the network. To access the network the client 110 may engage in an authentication process as will be described in greater detail herein.

More specifically, the method of FIG. 2 illustrates an initial session negotiation process between the client 110 and the access point 115, where the access point 115 determines if the client 110 has already been authenticated to use the wireless network 100. More specifically, the access point 115 receives a request to associate message 205 from the client 110. The access point 115 forwards this message to the WLAN controller 125. The WLAN controller 125 responds to the access point 115 with a client association reply message 210, which is forwarded to the client 110 by the access point 115 as an association reply message 215.

The client 110 may then respond to the access point 115 with an 802.11 protocol response packet 220 that initiates an authentication process 225 between the access point 115 and the WLAN controller 125. In an example embodiment, the authentication process includes the transmission of a client connected message 230 from the access point 115 to the WLAN controller 125 that informs the WLAN controller 125 that the client 110 is requesting access to the access point 115. Because the client 110 has not been authorized to use the access point 115, the WLAN controller 125 transmits a client not authorized response 235 to the access point. The receipt of message 235 completes the authorization process by indicating to the access point 115 that the client 110 is not authorized.

Figure 3:
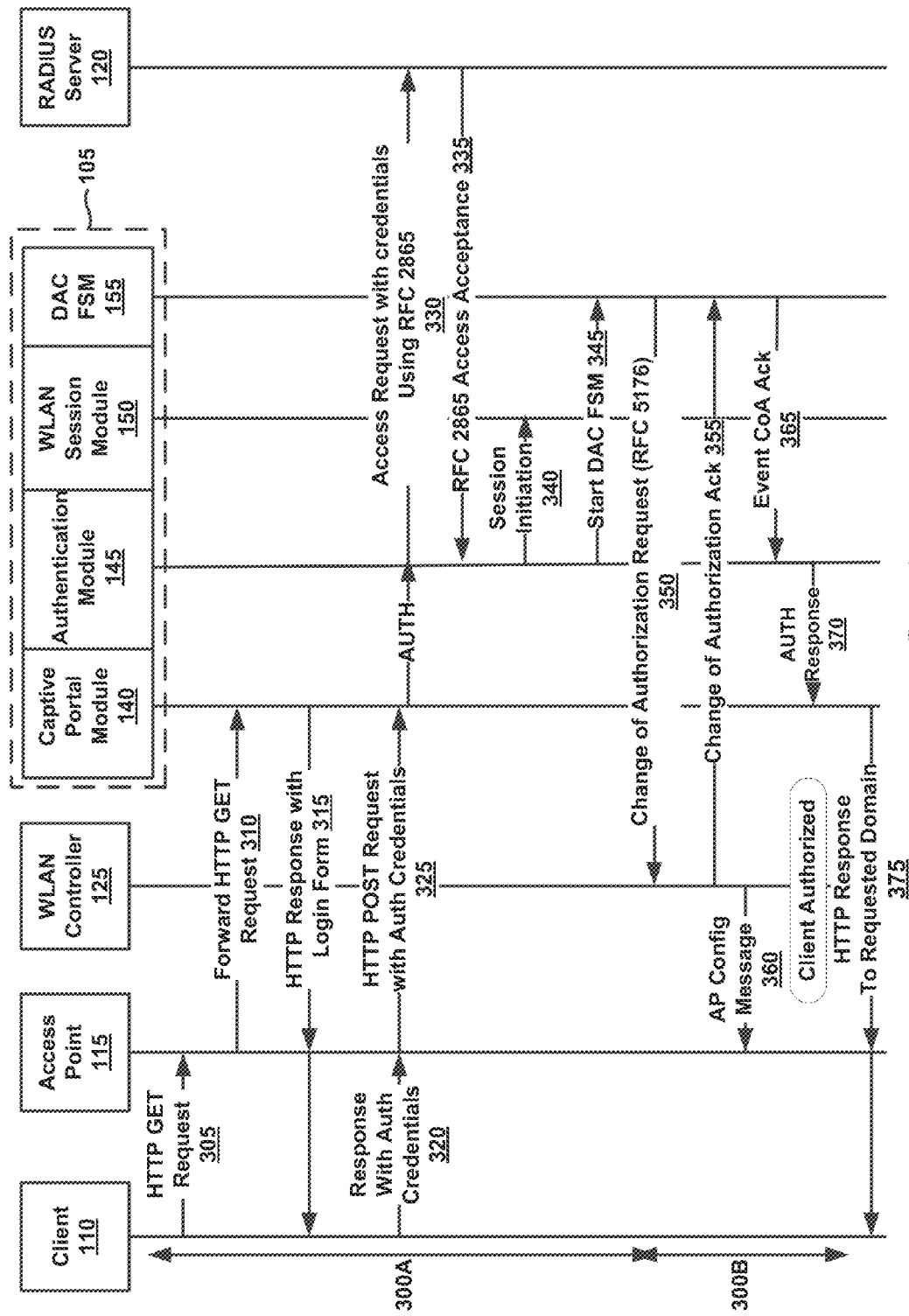
FIG. 3 is a signal flow diagram of a method for providing a captive portal that includes an HTTP redirection method a change of authorization (CoA) authentication method that utilizes the RFC 5176 protocol.

FIG. 3 is a signal flow diagram that illustrates the use of an out-of-band captive portal device (e.g., external captive portal device 105) in a wireless network. In some embodiments the process illustrated in FIG. 3 is executed within the wireless network 100 after completion of the initial authentication process as illustrated in FIG. 2. In some embodiments, the processes illustrated in FIG. 3 can be grouped into two distinct but combined processes, which include an HTTP redirect method 300A, which precedes an authorization method 300B that is RFC 5176 protocol compliant.

With regard to the HTTP redirect method 300A, the client 110 transmits an HTTP packet to the access point 115. This HTTP packet includes, for example, a HTTP GET request 305 where the client 110 is requesting a URL, such as www.example.com. In one example the user of the client 110 opens a web browser client that executes on the client 110. The web browser client generates the HTTP GET request.

This HTTP GET request is forwarded to the external captive portal device 105 in a message 310. In some embodiments, the HTTP GET request is processed by the captive portal module 140 of the external captive portal device 105. The captive portal module 140 responds to the request by generating a login form, which includes a graphical user interface that is configured to accept authentication credentials from a user of the client 110, such as a username and/or password. Other types of authentication credentials may also likewise be utilized in accordance with the present technology. Further, other methods for exchanging authentication credentials between the client 110 and a remote computing system are also likewise contemplated for use in accordance with the present embodiments, such as the exchange of public and private keys.

In an example embodiment, the login form is transmitted in an HTTP response message 315 that is transmitted to the access point 115. The access point 115 forwards the login form to the client 110 for display on the client 110. Thus, the request for the URL has been redirected to the login form. The user of the client 110 enters their authentication credentials in to the login form and the client 110 transmits this information to the access point 115 in a response message 320. The access point 115 forwards this authentication information to the external captive portal device 105 in an HTTP POST request 325. In general, an HTTP POST request includes any request that is received by a web server that specifies that the web server is to accept information included in the body of the message and store the same on the web server, for example in a storage device or in cache memory.

To authenticate the user of the client 110 the HTTP POST request that includes the authentication credentials of the user are transmitted by the captive portal module 140 of the external captive portal device 105 to the authentication module 145 of the external captive portal device 105, in some embodiments, the external captive portal device 105 can function as RADIUS server 120 and authentication requests can be performed within the external captive portal device 105. In some embodiments the authentication module 145 is configured to process the authentication credentials.

The authentication module 145 of the external captive portal device 105 forwards this information to the RADIUS server 120 in a RFC 2865 compliant response 330. The RADIUS server 120 then authenticates the user. Upon authentication, the RADIUS server 120 transmits to the authentication module 145 of the external captive portal device 105 an acceptance response 335 in a RFC 2865 compliant format. In some embodiments, the RFC 2865 protocol specifies the authentication and authorization characteristics for a RADIUS server and a protocol for transmitting of authentication, authorization, and configuration information between a network access server which desires to authenticate its links and a shared authentication server.

In some embodiments, the acceptance response 335 includes a plurality of parameters that govern the use of sessions by the client 110. These parameters include, but are not limited to bandwidth allowance, session timeout information, idle time allowance, as well as other parameters that define aspects of network sessions available for the client 110.

Once the client 110 is authenticated by the RADIUS server 120 a session initiation process is executed. In one embodiment, the session initiation process includes the authentication module 145 transmitting to the WLAN session module 150 a session initiation message 340 that includes a plurality of session attributes for the client 110. For example, the session attributes may include a username or identification for the client device, an IP address for the client 110, an idle time-to-live, and a session time-to-live, as well as other attributes that would be known to one of ordinary skill in the art.

According to some embodiments, upon receiving the session initiation message 340, the external captive portal device 105 will utilize an IP address of client 110 to authorize the client 110 on the WLAN controller 125 as well as an IP address (such as a CPIP address) of the external captive portal device 105 to determine an appropriate WLAN controller for the client 110. Advantageously, the use of IP addresses for session management provides distinct benefits over session management processes that rely on media access control (MAC) addresses and explicit WLAN controller information from the access point 115, which would force the WLAN controller to participate in session management message exchanges. Again, when the WLAN controllers are relieved of performing excess computing operations, such as those involved when the WLAN processes session management messages, the WLAN controllers operate more efficiently and increase the throughput of the wireless network by reducing network latency.

In some embodiments, the authentication module 145 transmits to the DAC FSM 155 a request 345 to instantiate a finite state machine for the client 110. The DAC FSM 155 instantiates a DAC FSM for the client 110. It will be understood that each client 110 that utilizes the access point 115 may be assigned their own DAC FSM by the external captive portal device 105.

With regard to the authentication method 300B utilized by the external captive portal device 105, the DAC FSM 155 established for the client 110 transmits to the WLAN controller 125 a change of authorization (CoA) request 350. The CoA request 350 includes a RFC 5176 compliant request. In some embodiments, the CoA request 350 may include a username, a network access server (NAS) IP address, as well as other parameters that were included in the RFC 2865 protocol response 335.

The RFC 5176 protocol is an extension of the user datagram profile (UDP) based RADIUS message. Thus, in various embodiments, the functionality for this protocol is already built into the external captive portal device 105. The WLAN controller 125 responds to the request 350 with a CoA Ack (Acknowledgement) message 355 for the DAC FSM 155. The WLAN controller 125 transmits to the access point 115 an access point configuration message 360 that includes authorization indication for the client 110.

In some embodiments by combining a HTTP redirection method and a RFC 5176 authentication method, the WLAN controller 125 may utilize the IP address of the client 110 to identify an active network session for the client 110. The use of client IP addresses makes linearly scaling of external captive portal devices possible by allowing the WLAN controller 125 to avoid processing session management messages, which would cause the WLAN controller 125 to impede the performance of the network.

After the DAC FSM 155 receives the CoA Ack message 355, the DAC FSM 155 response to the authentication module 145 with an even Ack message 365. The authentication module 145 then transmits to the captive portal module 14 an authentication response 370. The captive portal module 140 then provides to the access point 115 an HTTP response 375 that includes a redirect for the client 110 to the original URL that was included in the HTTP GET request 305.

According to some embodiments the access point 115 may load balance HTTP requests received from various clients based on a mapping between WLAN controllers and CPIP addresses. In some embodiments, the external captive portal device 105 may service up to 255 CPIP addresses, but individual WLAN domains may include up to eight CP IP addresses. As mentioned above, CPIP addresses may be evenly allocated among cluster nodes of external captive portal devices.

Figure 4:
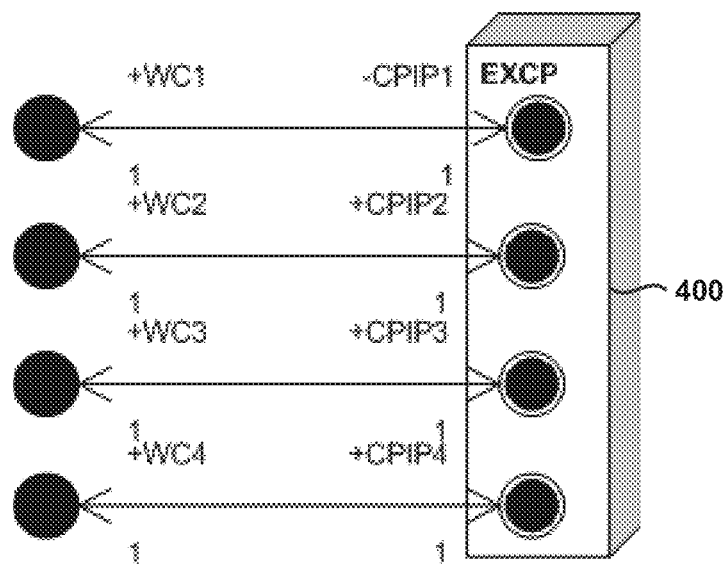
FIG. 4 illustrates CPIP address mapping for a single external captive portal device that is mapped to a plurality of wireless controllers.

FIG. 4 illustrates CPIP address mapping for a single external captive portal device 400 that is mapped to a plurality of wireless controllers (e.g., WLAN controllers), such as WC1, WC2, WC3, and WC4. In the illustrated example embodiment, each mapping includes a unique CPIP address for each wireless controller. For example, WC1 is associated with CPIP1, WC2 is associated with CPIP2, WC3 is associated with CPIP3, and WC4 is associated with CPIP4. Again, the single external captive portal device 400 can accommodate up to eight wireless controllers, each having their own unique CPIP address.

Figure 5:
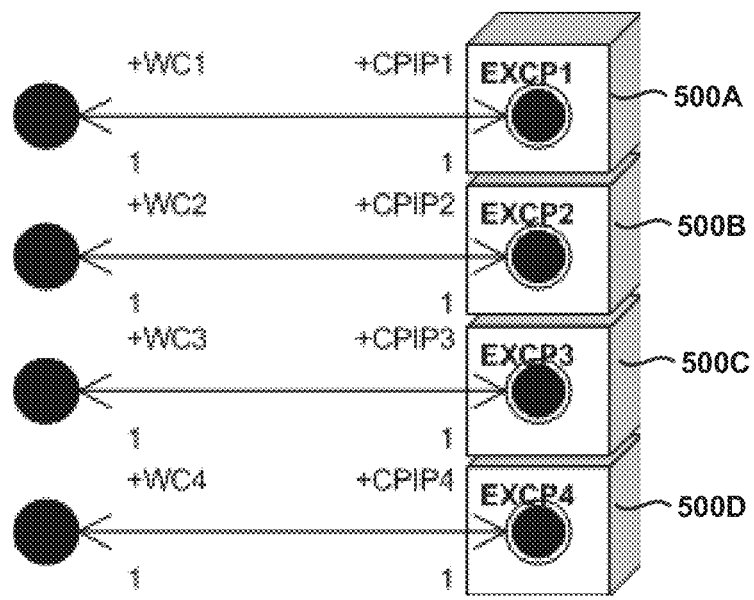
FIG. 5 illustrates CPIP address mapping for a plurality of external captive portal devices, where each of the plurality of external captive portal devices are mapped a single wireless controller.

FIG. 5 illustrates CPIP address mapping for a plurality of external captive portal devices 500A-D, where each of the plurality of external captive portal devices are mapped to a single wireless controller.

For example, external captive portal device 500A is coupled with a wireless controller WC1, which is associated with CPIP1. External captive portal device 500B is coupled with a wireless controller WC2, which is associated with CPIP2. Further, external captive portal device 500C is coupled with a wireless controller WC3, which is associated with CPIP3, and external captive portal device 500D is coupled with a wireless controller WC4, which is associated with CPIP4.

Figure 6:
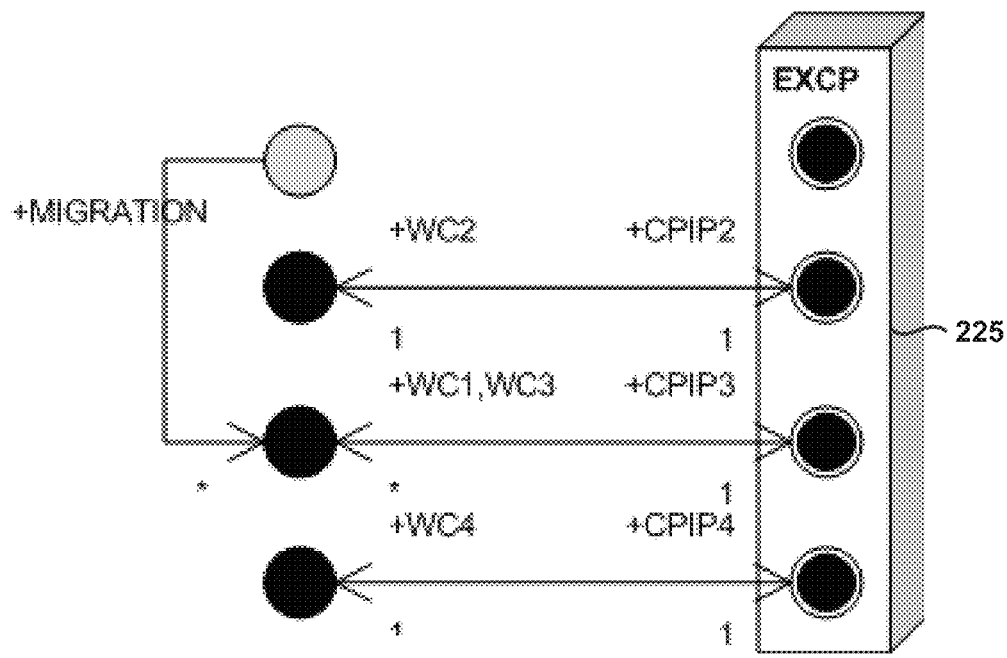
FIG. 6 illustrates a failover process performed by a single external captive portal device.

FIG. 6 illustrates an example failover process performed by a single external captive portal device 600. Initially, the external captive portal device 600 is coupled with four separate wireless controllers WC1-4, as illustrated in FIG. 4. Upon failure of WC1, by example, through loss of the CPIP address or by failure of WC1, the external captive portal device 600 may migrate WC1 to the mapping of WC3 and CPIP3. Now, WC1 and WC3 share the CPIP3 address.

Figure 7:
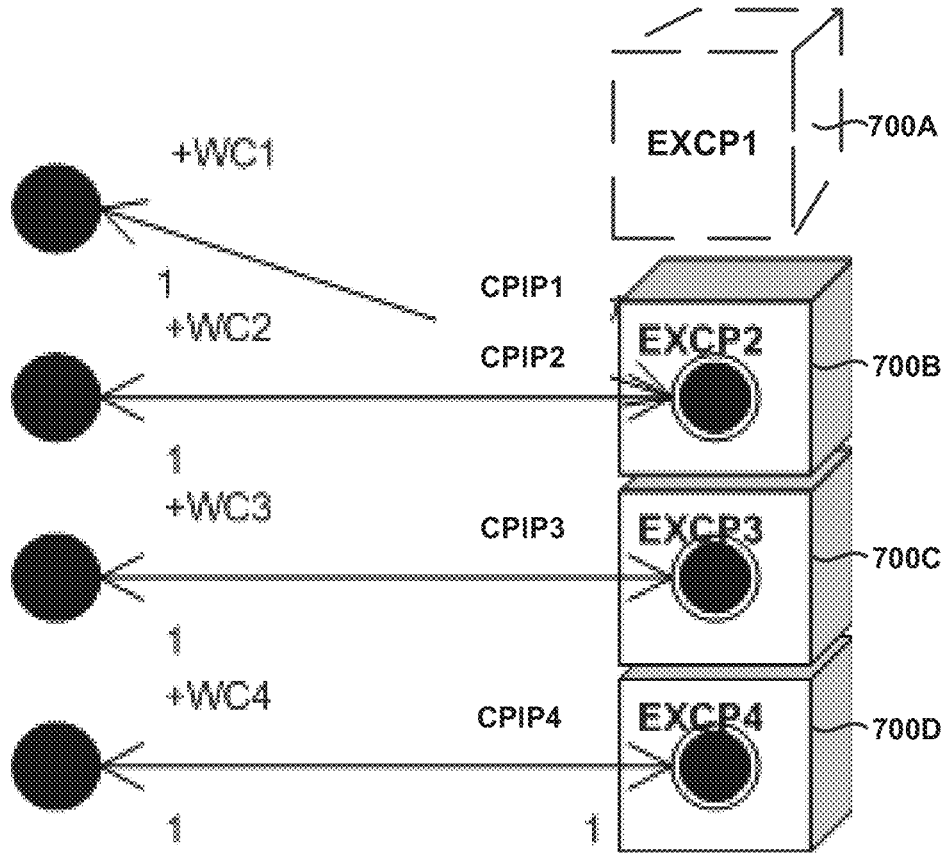
FIG. 7 illustrates a failover process performed by a plurality of external captive portal devices.

FIG. 7 illustrates an example failover process performed by a plurality of external captive portal devices 700A-D. The occurrence of a failover event with respect to external captive portal device 700A causes a remapping of the WC1 to a second external captive portal device 700B, which includes the mapping of CPIP1 to the second external captive portal device 700B. The second external captive portal device 700B now services both WC1 and WC2 using CPIP1 address and CPIP2 address, respectively.

Figure 8:
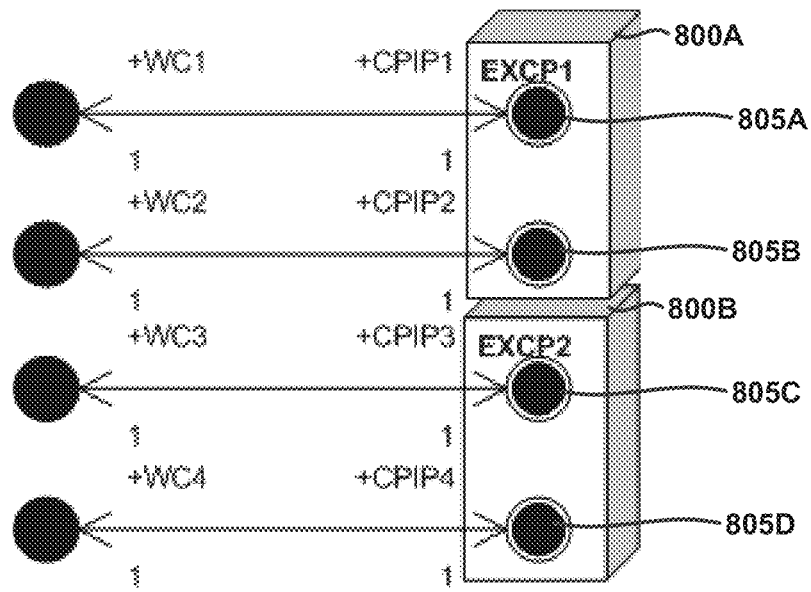
FIG. 8 illustrates another example arrangement of two external captive portal devices.

FIG. 8 illustrates another example arrangement of two external captive portal devices 800A and 800B. External captive portal device 800A includes a cluster of nodes 805A and 805B. Similarly, external captive portal device 800B includes nodes 805C and 805D. Each of the nodes 805A-D is associated with a wireless controller using a unique CPIP address.

Figure 9:
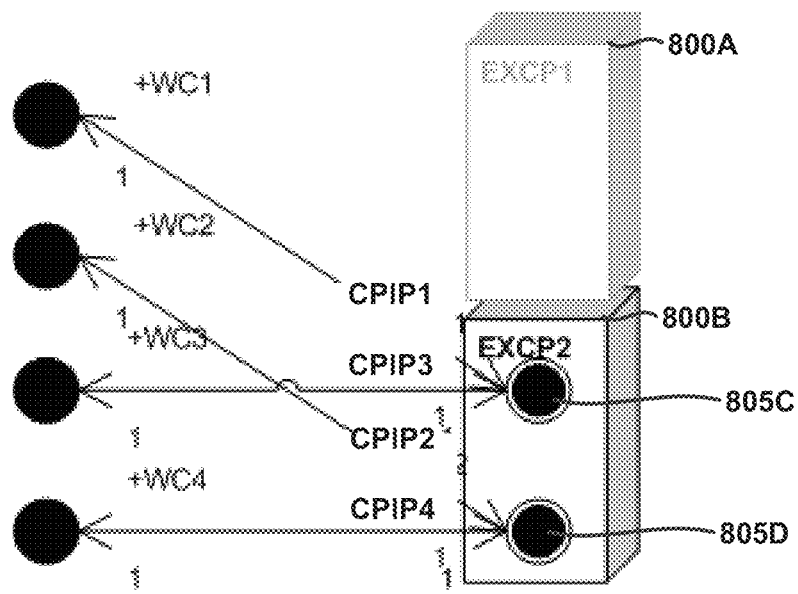
FIG. 9 illustrates a failover process for the arrangement illustrated in FIG. 8.

FIG. 9 illustrates an example failover process for the arrangement illustrated in FIG. 8. Namely, when external captive portal 800A experiences a failure event, the CPIP addresses that were mapped to the nodes of external captive portal 800A, such as CPIP1) are migrated to external captive portal 800B, Thus, node 805C of external captive portal 800B is now mapped to WC1 and WC3 using CPIP1 and CPIP3, respectively. Additionally, node 805D of external captive portal 800B is now mapped to WC2 and WC4 using CPIP2 and CPIP4, respectively. This failover process illustrates the even allocation of CPIP address across external captive portal nodes.

Figure 10:
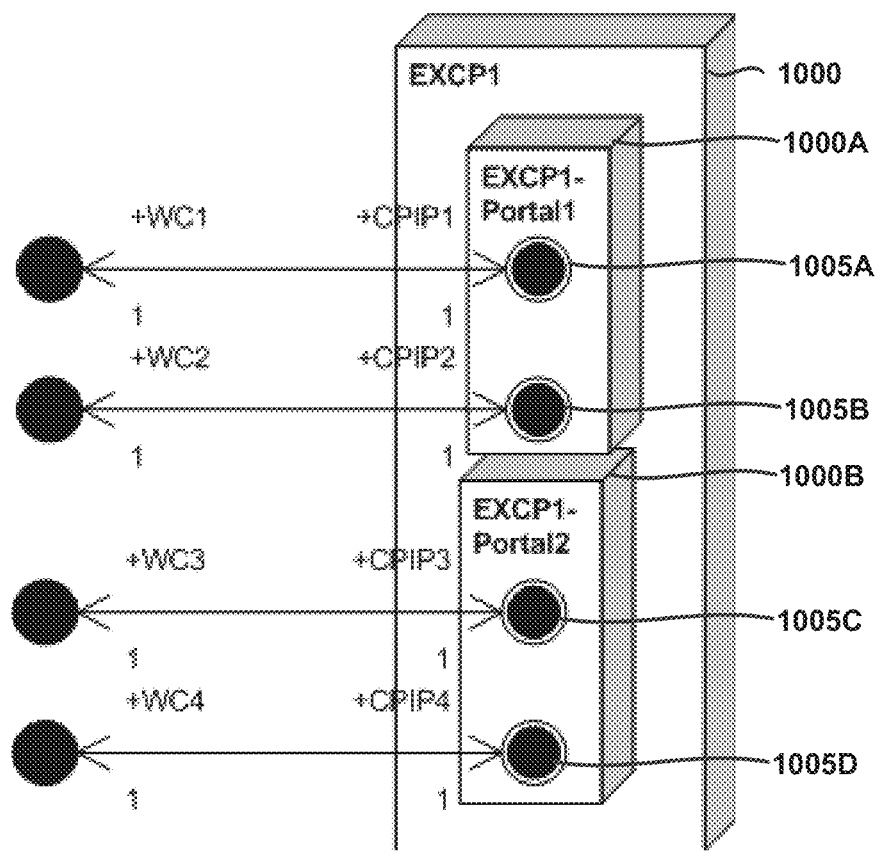
FIG. 10 illustrates yet another embodiment of a multi-tenant external captive portal device.

FIG. 10 illustrates yet another embodiment of a multi-tenant external captive portal device 1000. This multi-tenant external captive portal device 1000 includes two external captive portal devices 1000A and 1000B. These external captive portal devices 1000A and 1000B may be collocated in the same device or in the same location and networked together. External captive portal device 1000A includes a cluster of nodes 1005A and 1005B. Similarly, external captive portal device 1000B includes a cluster of nodes 1005C and 1005D. Each of the nodes 1005A-D is associated with a wireless controller using a unique CPIP address. The multi-tenant external captive portal device 1000 is configured to utilize any of the failover features described with respect to the devices of FIGS. 8 and 9.

FIGS. 11A-13B illustrate various example of a wireless networks that are configured to practice aspects of the present technology, which include the use of HTTP redirect methods in combination with authentication using RFC 5176 protocol CoA messages.

Figure 11A:
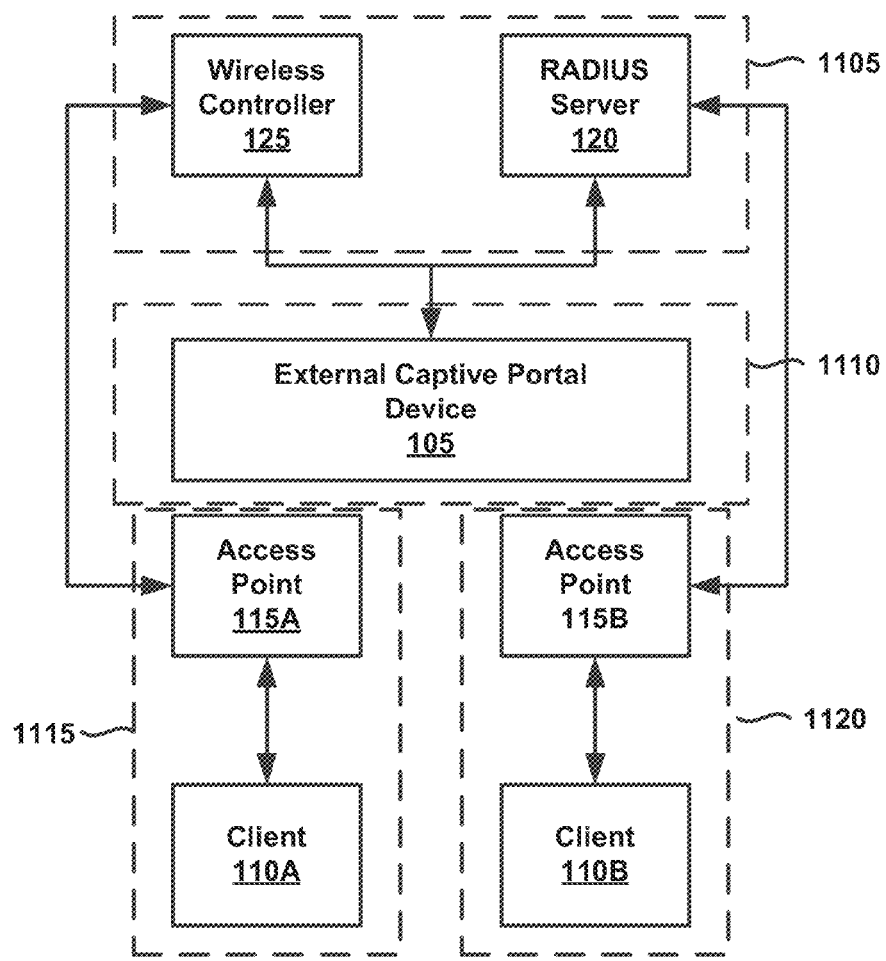
FIG. 11A is a schematic diagram of an example of a wireless network that can be used to practice aspects of the present technology.

FIG. 11A is a schematic diagram of an example of a wireless network. Generally, the network includes a wireless controller 125 and a RADIUS server 120 that are coupled with an external captive portal device 105. The wireless controller 125 and RADIUS server 120 form a single domain system virtual local area network (VLAN) 1105. The external captive portal device 105 serves as captive portal VLAN 1105. The wireless controller 125 services two access points 115A and 115B. Further, each of the access points 115A and 115B couple with clients 110A and 110B. The coupling of an access point and a client creates mobility VLAN. FIG. 11A includes two separate mobility VLANS 1115 and 1120.

Figure 11B:
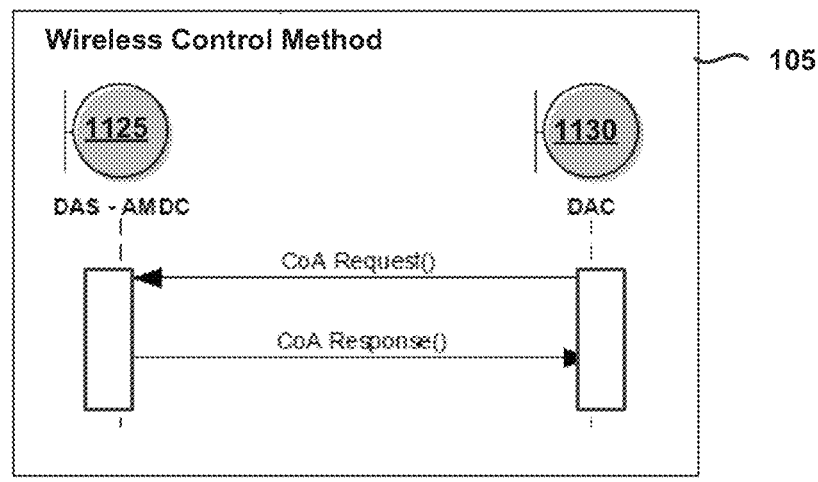
FIG. 11B is a signal flow diagram illustrating CoA operations performed by the external captive portal device of FIG. 11A.

FIG. 11B is a signal flow diagram illustrating CoA operations performed by the external captive portal device 105. More specifically, in this embodiment, the external captive portal device 105 includes a dynamic access server (DAS), active mobility domain controller (AMDC) module 1125 and a dynamic access client module (DAC) 1130. The DAS module 1125 and DAC 1130 cooperate to perform a change of authorization CoA process that is used to authenticate clients associated with the access point that is coupled to the wireless controller.

Figure 12A:
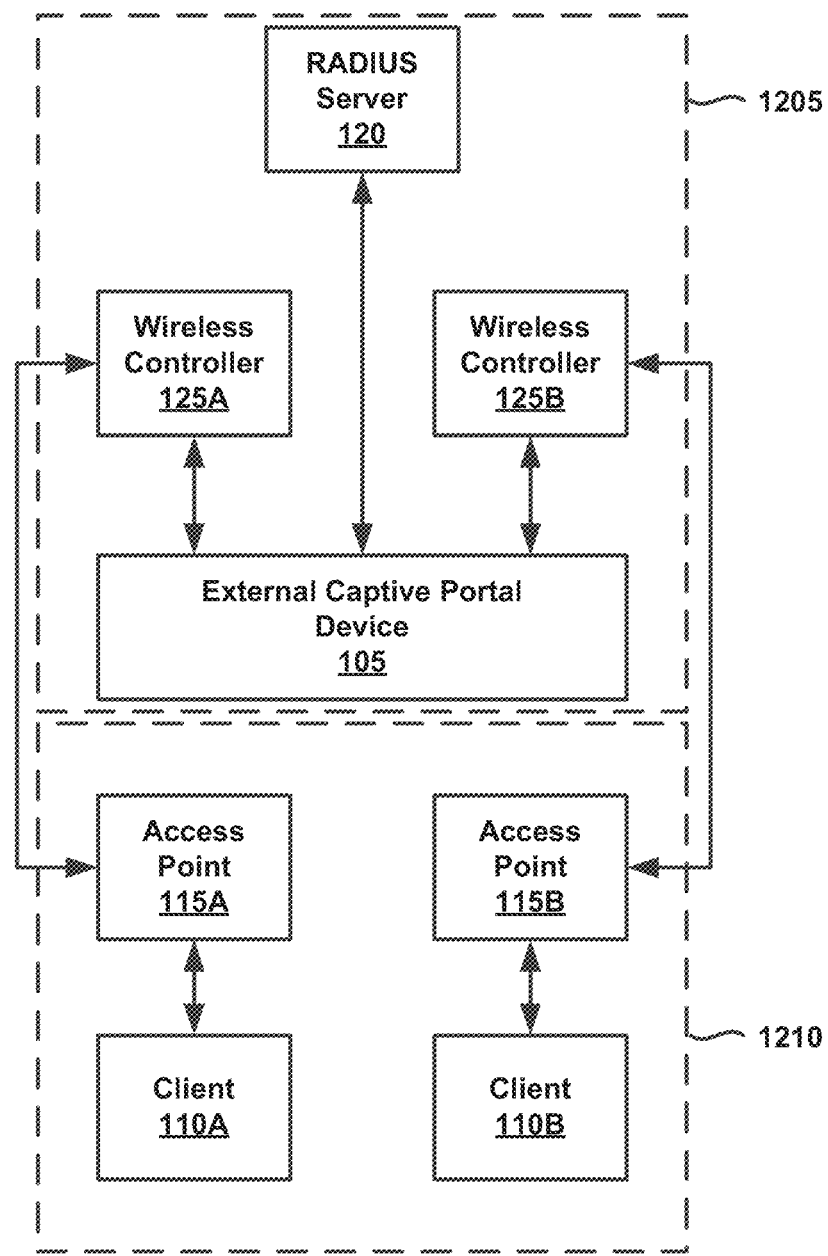
FIG. 12A is a schematic diagram of another example of a wireless network.

FIG. 12A is a schematic diagram of another example of a wireless network. The network includes a system VLAN 1205 that includes a RADIUS server 120, a plurality of wireless controllers, such as wireless controllers 125A and 125B, and an external captive portal device 105. The network also includes a mobility VLAN 1210 that includes a plurality of access points, such as access points 115A and 115B, which are in turn coupled with clients, such as client 110A (with access point 115A) and client 110B (with access point 115B).

Figure 12B:
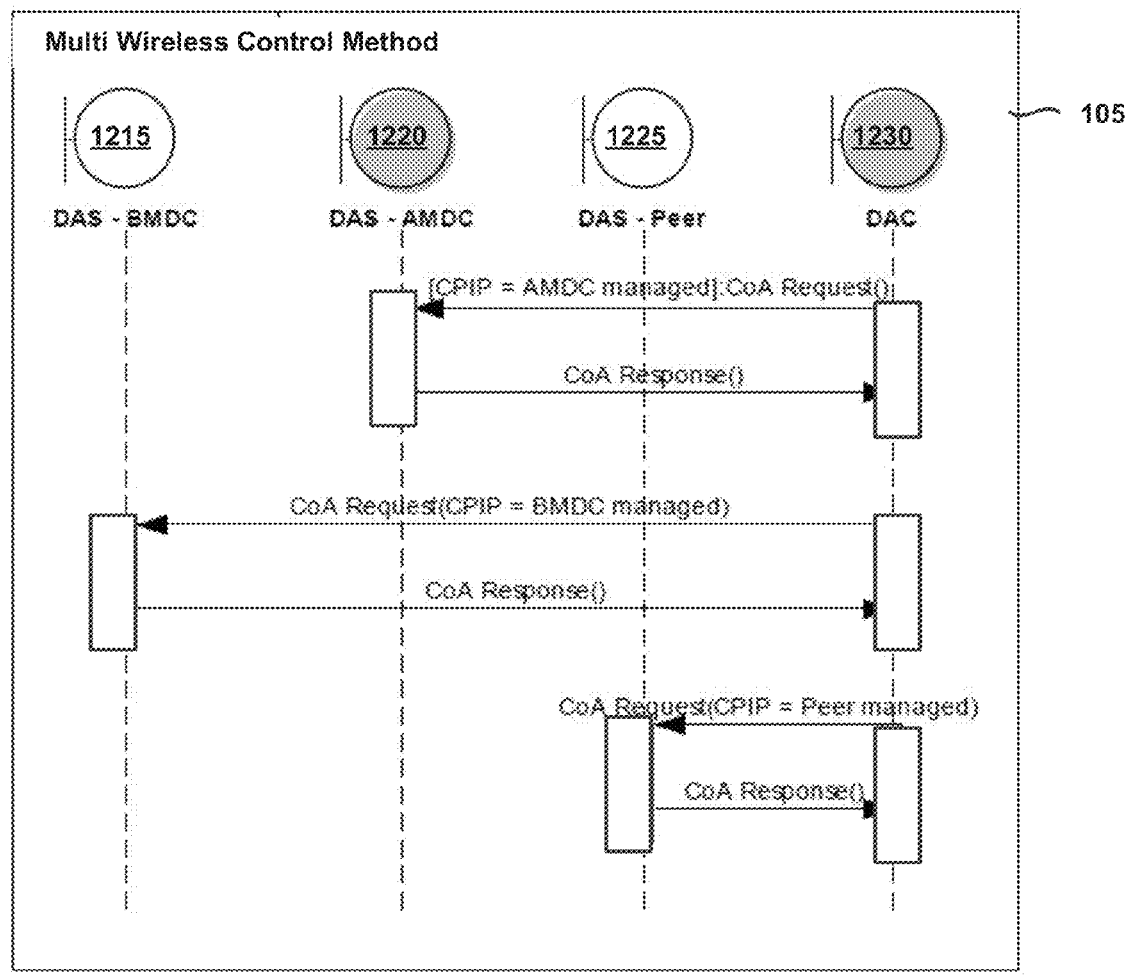
FIG. 12B is a signal flow diagram illustrating CoA operations executed by the external captive portal device of FIG. 12A.

FIG. 12B is a signal flow diagram illustrating CoA operations executed by the external captive portal device 105 that services multiple controllers, such as controllers 125A and 125B of FIG. 12A. The external captive portal device 105 includes a dynamic access server (DAS), backup mobility domain controller (AMDC) module 1215, a DAS AMDC 1220, a DAS peer module 1225, and a DAC module 1230. The DAC module 1230 can negotiate CoA requests with both the DAS AMDC module 1220 and the DAS BMDC module 1215, as well as the DAS peer module 1225. Having both an active DAS module 1220 and a backup DAS module 1215 allows the DAC 1230 to failover in the event that either the active DAS module 1220 or the backup DAS module 1215 fails.

The network of FIG. 12A may also be configured such that the mobility VLAN 1210 is divided into a plurality of mobility VLANs as shown in FIG. 11A. The control of these multiple mobility VLANS is mediated by the external captive portal device 105 similarly to the process illustrated in FIG. 12B.

Figure 13A:
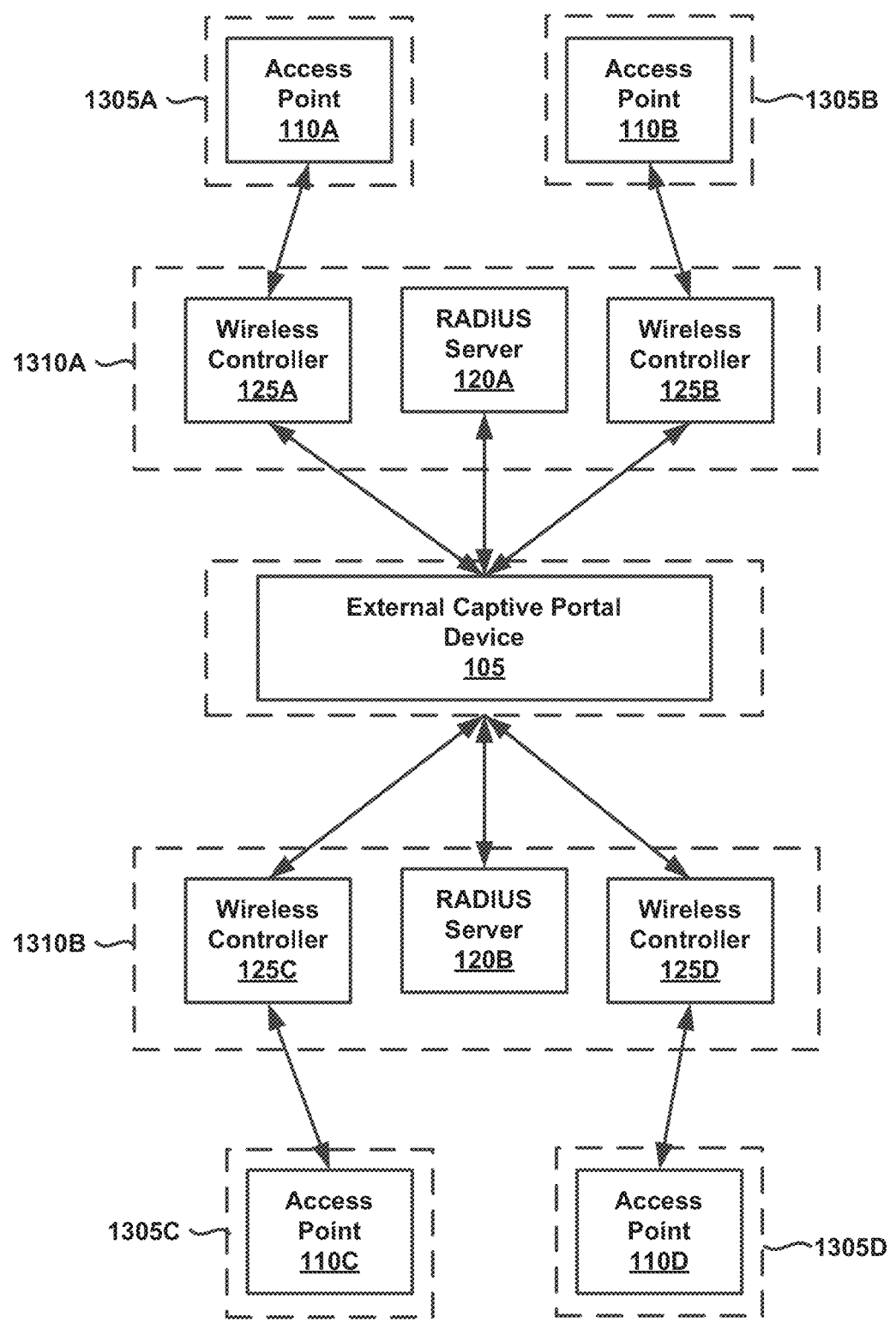
FIG. 13A is a schematic diagram of an additional example of a wireless network.

FIG. 13A is a schematic diagram of an a example embodiment of a wireless network. The network includes a plurality of access points 110A-D, which form individual mobility VLANS 1305A-D, respectively, with their associated clients (not shown). The mobility VLANS 1305A-B are coupled with a first system VLAN 1310A that includes wireless controllers 125A-B and a RADIUS server 120A.

The mobility VLANS 1305C-D are coupled with a second system VLAN 1310B that includes wireless controllers 125C-D and a RADIUS server 120B. Both the first and second system VLANS 1310A and 1310B are managed by the external captive portal device 105. The first and second system VLANS 1310A and 1310B are also referred to as domains. Thus, the network of FIG. 13A includes multiple domains, which also include multiple controllers.

Figure 13B:
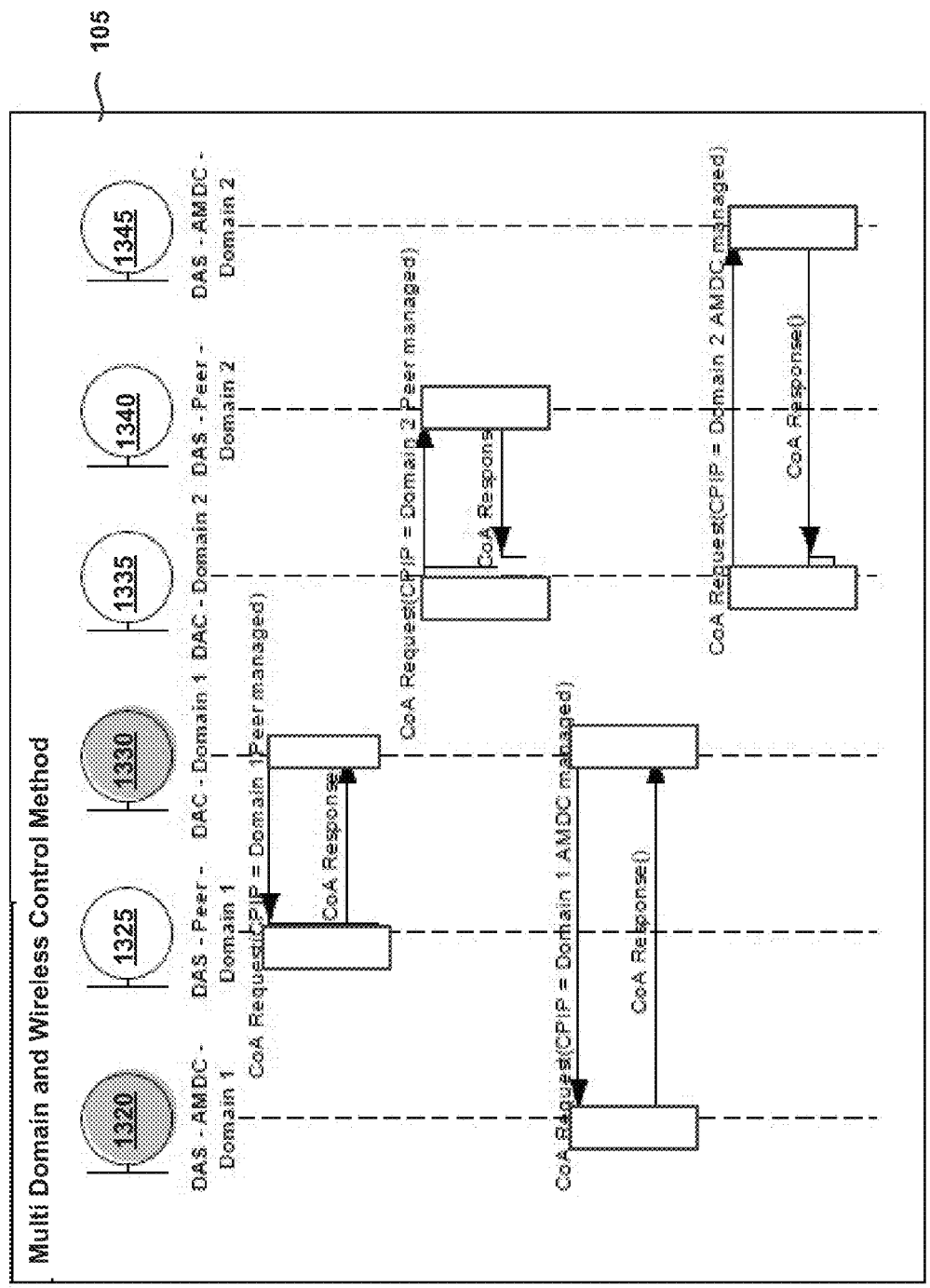
FIG. 13B is signal flow diagram illustrating CoA operations executed by the external captive portal device of FIG. 13A.

FIG. 13B is a signal flow diagram illustrating CoA operations executed by the external captive portal device 105. The external captive portal device 105 comprises, for a first domain (first system VLAN 1310A), a DAS AMDC module 1320, a DAS peer module 1325, and a DAC module 1330. The external captive portal device 105 also comprise, for a second domain (second system VLAN 1310B), a DAS AMDC module 1345, a DAS peer module 1340, and a DAC module 1335. The external captive portal device 105 may manage CoA requests and responses exchanged between the DAS AMDC module 1320 and the DAC module 1330 of the first domain, and the DAS peer module 1325 and the DAC module 1330 of the first domain. The external captive portal device 105 may manage CoA requests and responses exchanged between the DAS AMDC module 1345 and the DAC module 1335 of the second domain, and the DAS peer module 1340 and the DAC module 1335 of the second domain.

Figure 14:
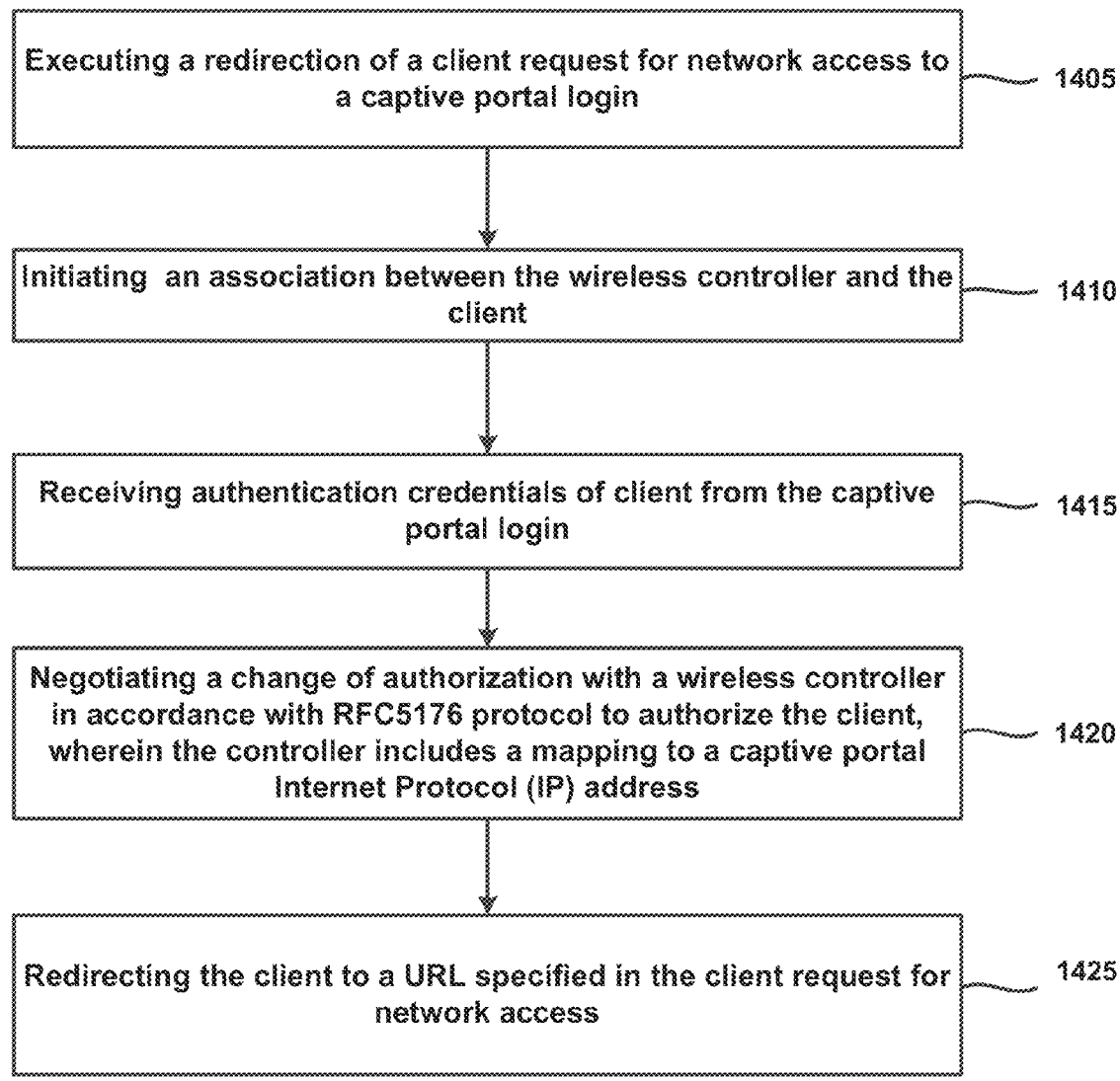
FIG. 14 is a flowchart of an example of a method for providing a captive portal.

FIG. 14 is a flowchart of an example of a method that is executed within device wireless controller. The method includes executing 1405 a redirection of a client request for network access to a captive portal login, as well as initiating 1410 an association between the wireless controller and the client. In some instances the method includes receiving 1415 authentication credentials of client from the captive portal login and negotiating 1420 a change of authorization with a wireless controller in accordance with RFC 5176 protocol, wherein the controller includes a mapping to a captive portal Internet Protocol (IP) address. According to some embodiments the method includes redirecting 1425 the client to a URL specified in the client request for network access.

The present embodiments improve resource utilization within a wireless network. More specifically, the present technology allows for efficient operation of wireless local area network (WLAN) controllers in a wireless network and provides flexible scaling requirements. In some embodiments, improvements in WLAN controller performance can be achieved once HTTPS is enabled on the wireless network by decoupling the HTTPS enablement from the WLAN controller until the last moment when final authorization for client network access is required. Various embodiments discussed above, may improve the scalability of the wireless network due to a reduction in operations that are required of the WLAN controller.

In some embodiments, out-of-band captive portal systems that incorporate captive portal Internet protocol (IP) address mapping, access point load balancing, and an efficient change of authorization (CoA) architecture. Additionally, the present technology improves the performance of a wireless network that utilizes a captive portal without requiring the wireless controller to engage in additional secure socket layer (SSL) negotiations. Indeed, the present technology reduces the workload of the WLAN controllers in a wireless network, which include, but are not limited to authentication and processing intensive SSL key negotiation procedures.

In an example embodiment, the present technology allows for the mapping and management of captive portal IP addresses (hereinafter referred to as "CPIP" addresses), within the wireless controller(s) of a wireless network. In various embodiments, a CPIP address is configured in both the external captive portal device and the wireless controller, but enablement of the CPIP address may occur in the external captive portal device. In some embodiments, each external captive portal device is assigned its own CPIP address or set of CPIP addresses when multiple wireless controllers are present. According to some embodiments, the CPIP address is a virtual IP address that is hosted by the external captive portal device. Additionally, external captive portal devices in a wireless network can be clustered depending on scaling requirements for the network. In embodiments where external captive portal devices are clustered, CPIP addresses may be evenly allocated across the external captive portal device cluster nodes.

In some instances, the wireless networks of the present technology allows for failover of CPIP addresses to an active external captive portal device cluster node, when one or more of the external captive portal device cluster nodes fail. This process is also referred to as floating IP address allocation. The load balancing and distribution of CPIP addresses may be mediated by an access point associated with the external captive portal device cluster nodes.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally and interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 15:
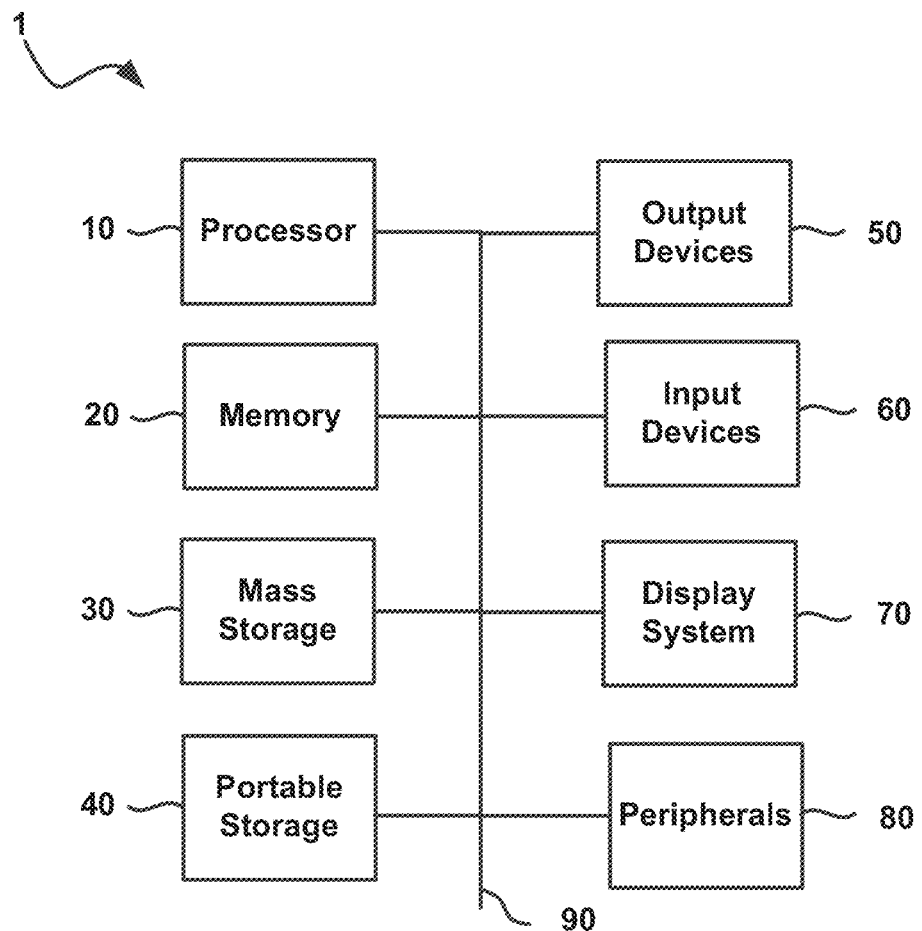
FIG. 15 illustrates an example of a computing system that may be used to implement embodiments of the present technology.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale FIG. 15 illustrates an exemplary computing device 1 that may be used to implement an embodiment of the present systems and methods. The system 1 of FIG. 15 may be implemented in the contexts of the likes of computing devices, radios, terminals, networks, servers, or combinations thereof. The computing device 1 of FIG. 15 includes a processor 10 and main memory 20. Main memory 20 stores, in part, instructions and data for execution by processor 10. Main memory 20 may store the executable code when in operation. The system 1 of FIG. 15 further includes a mass storage device 30, portable storage device 40, output devices 50, user input devices 60, a display system 70, and peripherals 80.

The components shown in FIG. 15 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 15. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 16 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 15 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Example embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described example embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method comprising:
executing a redirection of a client request for network access to a captive portal login;
initiating an association between a wireless controller and the client;
mapping one or more captive portal IP addresses to the wireless controller prior to receiving the client request for network access;
receiving a RFC (Request for comments) 2865 protocol compliant message from an authentication server;
creating a finite state machine, wherein the finite state machine further negotiates a change of authorization with the wireless controller in accordance with RFC 5176 protocol to authorize the client; and
redirecting the client to a URL (Uniform Resource Locator) specified in the client request for network access.

2. The method according to claim 1, further comprising directing network packets from an authenticated client to the wireless controller based upon an IP address of the client.

3. The method according to claim 1, further comprising establishing a virtual local area network that comprises the authorized client and a wireless access point associated with the wireless controller.

4. The method according to claim 1, further comprising reallocating the client to a second wireless node, when a first wireless node fails, by reallocating the captive portal IP address with the wireless node to the second wireless node.

5. A captive portal device, comprising:
a hardware processor; and
a memory for storing one or more instructions that when executed by the hardware processor cause the captive portal device to:
execute a redirection of a client request for network access to a captive portal login;
initiate an association between a wireless controller and the client;
map one or more captive portal IP addresses to the wireless controller prior to receiving the client request for network access;
receive a RFC 2865 protocol compliant message from an authentication server;
create a finite state machine, wherein the finite state machine further negotiates a change of authorization with the wireless controller in accordance with RFC 5176 protocol to authorize the client; and
redirect the client to a URL specified in the client request for network access.

6. The captive portal device according to claim 5, wherein the one or more instructions comprise an authentication module, the authentication module being executed by the hardware processor to receive access point configuration parameters from an authentication server.

7. The captive portal device according to claim 5, wherein the finite state machine transmits a change of change of authorization request to the wireless controller, the change of authorization request comprising any of a username, an IP address for the wireless controller, a maximum or minimum bandwidth, a session time-to-live, or idle timeout.

8. The captive portal device according to claim 5, wherein the captive portal device redirects the client to the URL included in the request for network access after the client has been authorized according to the change of authorization process executed between the captive portal device and the wireless controller.

9. The captive portal device according to claim 5, wherein the captive portal device couples with a plurality of wireless controllers using a unique captive portal IP address, the wireless controller being one of the plurality of wireless controllers.

10. The captive portal device according to claim 5, wherein the captive portal device dynamically reallocates captive portal IP addresses to active wireless controllers when one or more of the plurality of wireless controllers fails.

11. The captive portal device according to claim 10, wherein when more than one of the plurality of wireless controllers fails the captive portal device evenly distributes captive portal IP addresses of the failed wireless controllers to active wireless controllers.

12. A wireless controller, comprising:
a hardware processor; and
a memory for storing instructions that when executed by the hardware processor cause the wireless controller to:
receive a client request for network access from an access point associated with a client;
establish an association between the access point and the client, the association not allowing access to the network by the client;
map one or more captive portal IP addresses to a wireless controller and transmitting an associated one of the mapped captive portal IP addresses to a captive portal device; and
create a finite state machine, wherein the finite state machine further negotiates a change of authorization with the captive portal device according to an RFC 5176 protocol to authorize the client.

13. The wireless controller according to claim 12, further comprising instructions that when executed by the hardware processor cause the hardware processor to redirect the client to the URL specified in the client request for network access based upon an IP address of the client.

14. The wireless controller according to claim 12, further comprising transmitting to the access point a configuration message that includes the captive portal IP address.

15. The wireless controller according to claim 12, further comprising forwarding a captive portal login of the captive portal device to the access point.

16. The wireless controller according to claim 12, further comprising forwarding authentication credentials of the client to the captive portal device.

* * * * *